Sept. 13, 1932.   G. GRAY ET AL   1,876,918
COUPLING FOR CARS AND TRAIN LINES
Filed July 2, 1931   7 Sheets-Sheet 1

Inventors
Carnegie Kingston
George Gray
By Clarence A. O'Brien
Attorney

Fig. 5.

Inventors
Carnegie Kingston
George Gray
By Clarence A O'Brien
Attorney

Sept. 13, 1932.  G. GRAY ET AL  1,876,918
COUPLING FOR CARS AND TRAIN LINES
Filed July 2, 1931  7 Sheets-Sheet 5

Inventors
Carnegie Kingston
George Gray
By Clarence A. O'Brien
Attorney

Sept. 13, 1932.　　　　G. GRAY ET AL　　　　1,876,918
COUPLING FOR CARS AND TRAIN LINES
Filed July 2, 1931　　　　7 Sheets-Sheet 6

Inventor
Carnegie Kingston
George Gray
By Clarence A. O'Brien
Attorney

Sept. 13, 1932.　　　G. GRAY ET AL　　　1,876,918
COUPLING FOR CARS AND TRAIN LINES
Filed July 2, 1931　　　7 Sheets-Sheet 7

Inventor
Carnegie Kingston
George Gray
By Clarence A. O'Brien
Attorney

Patented Sept. 13, 1932

1,876,918

UNITED STATES PATENT OFFICE

GEORGE GRAY AND CARNEGIE KINGSTON, OF JACKSONVILLE, FLORIDA; SAID KINGSTON ASSIGNOR TO SAID GRAY

COUPLING FOR CARS AND TRAIN LINES

Application filed July 2, 1931. Serial No. 548,450.

This invention relates to a coupling device for use on railway cars, and has particular reference to such coupling devices whereby cars are coupled together, and the train lines for carrying air, steam and water are simultaneously effectually coupled.

A primary object of the invention is therefore to improve on such type of coupling for car and train lines, and with this end in view, the invention consists in the novel construction, combination and arrangement of parts as hereinafter more fully referred to, as shown in the accompanying drawings and claimed.

Referring more in detail to the drawings, reference being had to the Figures 1 to 8 inclusive, 1 and 2 indicates the end portions of two railway cars to which my improved coupling devices have been applied.

Each of the railway cars, is provided with a draft bar 3 on the end of which is mounted a somewhat conventional type of coupling 4 including a pivotally mounted jaw 5, and the jaws 5 of the two coupling devices are normally retained in locked engagement through the medium of pins 6 having suitable link connections 7 with crank arms 8 on rock shafts 9 disposed transversely at the ends 1 and 2 of the cars. Upon rocking of the shafts 9, the jaws are moved into and out of locking engagement with one another. To prevent casual unlocking of the jaws, there is provided for each jaw a locking pin 10 having suitable connection with a crank arm 11 of one shaft 9.

Shafts 9 at their ends are provided with crank handles 12 whereby the coupling and uncoupling of the cars may be effected without requiring a trainman entering between the cars.

On each railway car, there is supported below the draft beam 3 thereof a pair of relatively spaced parallel supporting bars 13 slidable in bearing brackets 14 secured to the draft beam 3. For each of the rods 13 is provided a suitable spring cushioning device 15. Each of the bars 13 has suitably secured thereto a plurality of sleeves 16 connected by a horizontal bar 17. Rods 18 at their upper ends extend through suitable openings provided in the bars 17 and have nuts 19 threadedly engaged with said ends.

Each pair of bars 18 is connected by upper and lower pairs of metallic straps 20, and the pairs of straps support between the bars 18 a vertically disposed plate 21. For accommodating the ends of the bars 20 there are slidable on the rods 18 guide blocks 22 having opposite edges grooved as at 22' for receiving the end portions of the bars 20.

The lower ends of the rods 18 are braced with respect to the bars 17 through the medium of brace bars 23. Cushioning springs 24 are disposed about the upper portions of the bars 18 between blocks 22 and the adjacent ends of the bars 17. Additional cushioning springs 25 are disposed about the lower ends of the rods 18 between the lower set of guide blocks 22 and the lowermost ends of the brace rods 23.

The train lines for each of the cars are designated generally by the reference character 26, and each of the lines is provided with a valve 27, the stem of two of which valves is each provided with a pair of diverging crank arms 28, 29.

Suitable coupling evices designated generally by the reference character 30 are provided for the train lines, and since these devices are identical in construction, it is thought that a detail description of one will teach the description of the others. Accordingly, and as shown, each of the coupling devices 30 includes a female member 31 provided with a box 32 having a bell shaped mouth at one end and certain of each of the boxes being each restricted at its other end to provide a cylinder extension 33. The male member of the coupling device is designated by the reference character 34 and includes a shank like body provided at one end with an enlarged head 35 adapted to be received in the box 32 as clearly suggested in Figures 3, 6 and 7. The head 35 is provided with a metallic wear plate 36 provided with a concave recess or seat 37 adapted to accommodate a spring pressed locking plunger 38 vertically reciprocably mounted in a cylinder 39 provided at the top of the boxing 32. Plunger 38 engaged with the seat 36 serves to retain the member 34 in engagement with the member 31 with one side of the head 35 flatly contacting a gasket 40 provided in the bottom of the box 32.

The male member 34 of each of two of the coupling devices, is normally urged out of engagement with the female member 31 through the medium of a spring pressed plunger 41 mounted for reciprocation in the cylinder 33 and provided with a stem or rod 42 the free end of which is suitably formed to engage the slot provided in the arm 28 of that valve 26 connecting the member 31 of the coupling device with a particular one of the train lines 26.

Figure 3:
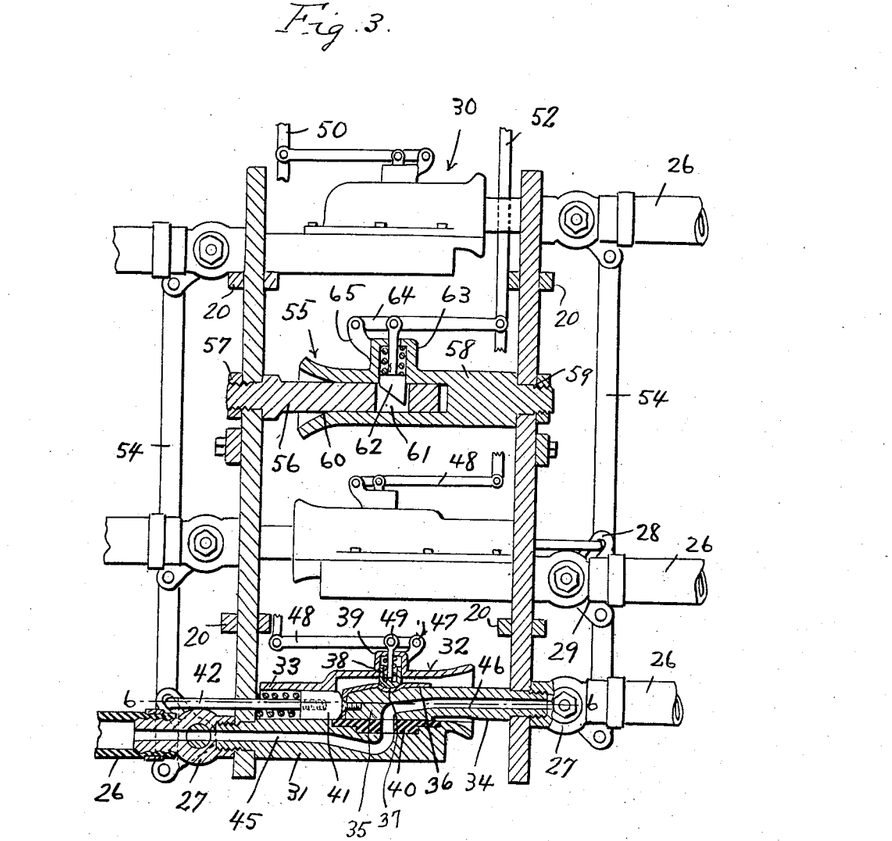
Figure 3 is a longitudinal vertical sectional elevational view through the train line coupling.

As shown to advantage in Figure 3, the upper and lower coupling devices 30 have their female members 31 suitably supported on one of the plates 21, and their male members 34 suitably supported on the other of the plates 21; the intermediate one of the devices 30 has its male member supported on that plate 21 supporting the female members of the upper and lower coupling devices 30, and its female member supported on that plate 21 which supports the male members 34 of the said upper and lower coupling devices 30.

Each of the coupling devices 30 has that valve 27 which couples its female member 31 with a train line 26 connected with its boxing 32 through the medium of a passage 45 provided in the body of the female member 31.

The male member 34 of each of the coupling devices is provided with a passage 46 for connecting the passage 45 with that valve 27 connecting the male member 34 with a particular one of the pipe lines 26 so that, when the parts of the coupling devices are in engagement one with the other, and the valves are in opened position, there is provided for an uninterrupted flow from the pipe lines of one car to the pipe lines of the second car coupled thereto.

Each coupling device 30 adjacent its cylinder 39 is provided with an arm 47 to which is pivotally connected one end of a link 48. The locking plungers 38 of the coupling devices are provided with stems which at their upper ends are pivotally connected to the links 48 as at 49.

The links 48 of the upper and lower coupling devices 30 are connected by a rod 50 which in turn at its upper end is pivotally connected to a crank arm 51 provided on the crank shaft 9 supported on the car end 1. The link 48 of the intermediate coupling device 30 is pivotally connected to the lower end of a rod 52 which at its upper end is pivotally connected to a crank arm 53 provided on that crank shaft 9 supported on the car end 2.

The vertically alined valves 27 have their crank arms 29 pivotally connected to a common connector bar 54.

Figure 1:
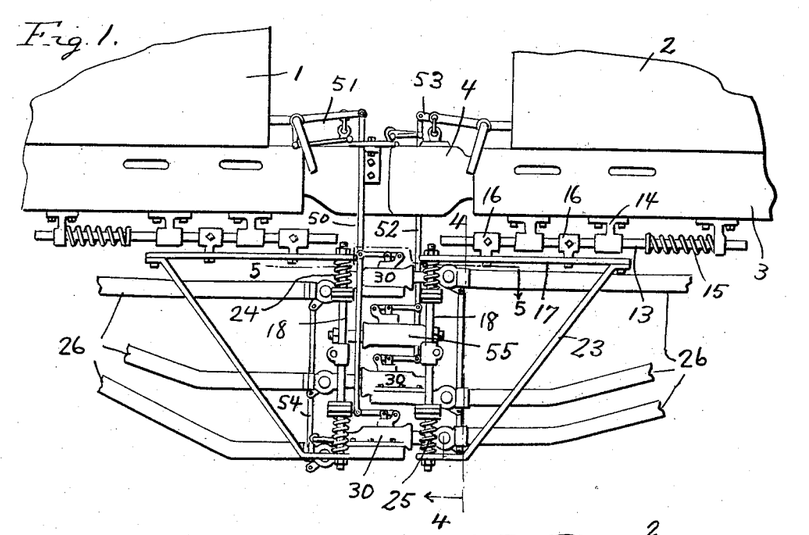
Figure 1 is a side elevation of a portion of the ends of two cars having my improved coupling applied thereto.
Figure 2:
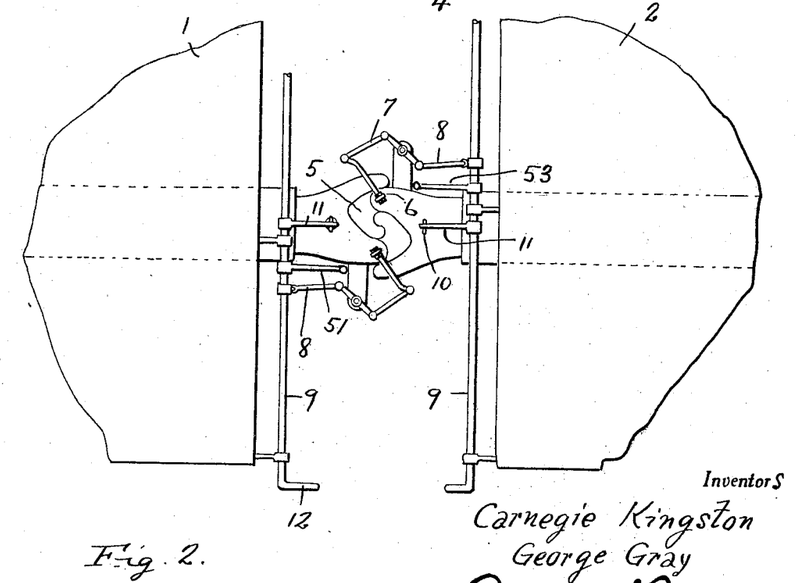
Figure 2 is a top plan view thereof.

From what has been hereinbefore said, it will be apparent, that when the ends of the cars are coupled together as shown in Figure 1, the said cars may be uncoupled by rocking the shafts 9 in one direction to move the pins 6 and 10 out of engagement with the jaws 5 permitting the jaws to swing away from one another to release the coupling devices 4. At the same time, by reason of the links 48 being connected by the rods 50 and 52 which in turn are connected to the crank arms 51 and 53, the locking plungers 38 of the coupling devices are moved out of engagement with the seats 37 of the male members of the coupling devices whereupon the plungers 41 will be free to move under action of their springs for forcing the male members 34 out of engagement with the female members 31 as is thought apparent. This action of the plungers 41 by reason of the operative connection between the stems 42 of the plungers with the slotted arms 28 of the valves 27 cause all the valves 27 to be simultaneously moved to a closed position to prevent the escape of fluid from the pipe lines 26.

As will be apparent from a study of Figure 3, that because of the alternate arrangement of the male and female members of the coupling devices, it will not be necessary for the uppermost coupling device 30 to be provided with a cylinder 33 and plunger 41 and that only those valves 27 associated with the female members 31 of the lowermost and intermediate coupling devices need be provided with the slotted crank arms 28.

Plates 21 are adapted to be coupled together through the medium of a coupling device located between two adjacent coupling devices 30. This last referred to coupling device generally designated by the reference character 55 includes a male member 56 supported at one end on one of the plates 21 as at 57, and a female member 58 supported at one end as at 59 on the other of the plates 21. The female member 58 at its free end is provided with a boxing 60 for accommodating the free end of the male member 56. Said free end of the male member 56 is provided with an opening 61 for engagement with a beveled locking plunger 62 that is adapted for reciprocation in a vertical cylinder 63 provided on the female member 58. Plunger 62 is spring pressed, as shown, and has the stem thereof pivotally connected to a link 64 which link 64 is pivotally connected at one end to an arm 65 provided on the female member 58 and at its opposite end connected to the rod 52 so that plunger 62 will be moved into and out of engagement with the notch 61 simultaneous with the movement of the plungers 38 into and out of engagement with the seats 37.

In order to yieldably maintain the plates 21 centrally positioned between the pairs of rods 18, there is provided for each plate 21 a pair of bars riveted or otherwise secured to the plates one on each side of the plate and merging into common terminals 66a slidable through apertures provided on fixed collars 67 rigidly secured to intermediate portions of the rods 18. Springs 38 are convoluted about the terminals 66a and bear against collars 68 to act oppositely relative to one another on the plate 21.

From a study of Figure 3, it will be seen that the valves 27 are intended to be moved to a closed position, only upon release of the coupling devices 30. By referring to Figures 9 to 12 inclusive, it will be seen that I have provided an arrangement of parts whereby, say, for example, the train line controlling the brakes, may be manually controlled shutting off a passage of steam, air or the like therethrough without requiring an uncoupling of the cars. The structure shown in the last referred to figures is intended especially for use in an emergency for bringing the rolling stock to a stop for any reason whatsoever.

Thus referring more specifically to Figures 9 to 12 inclusive, it will be seen that the coupling device therein designated generally by the reference character 30a is in many respects the exact duplicate of a coupling 30. The coupling 30a may be so located in any desired manner between cars coupled by the structure shown in Figures 1 to 8 inclusive. In this particular instance I have merely shown the coupling 30a independently of the structure shown in Figures 1 to 8, since the location of the coupling 30a relative to the structure shown in Figures 1 to 8 is not of the essence of the invention.

Figure 4:
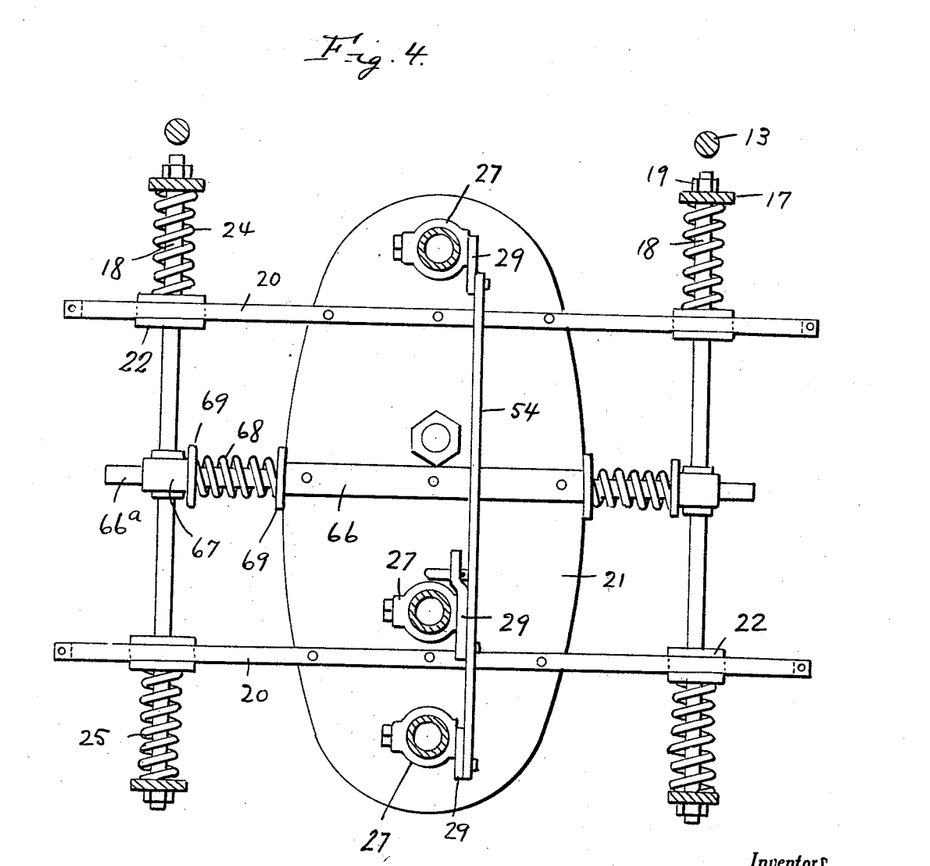
Figure 4 is a vertical detail sectional elevational view taken substantially on the line 4—4 of Figure 1.
Figure 5:
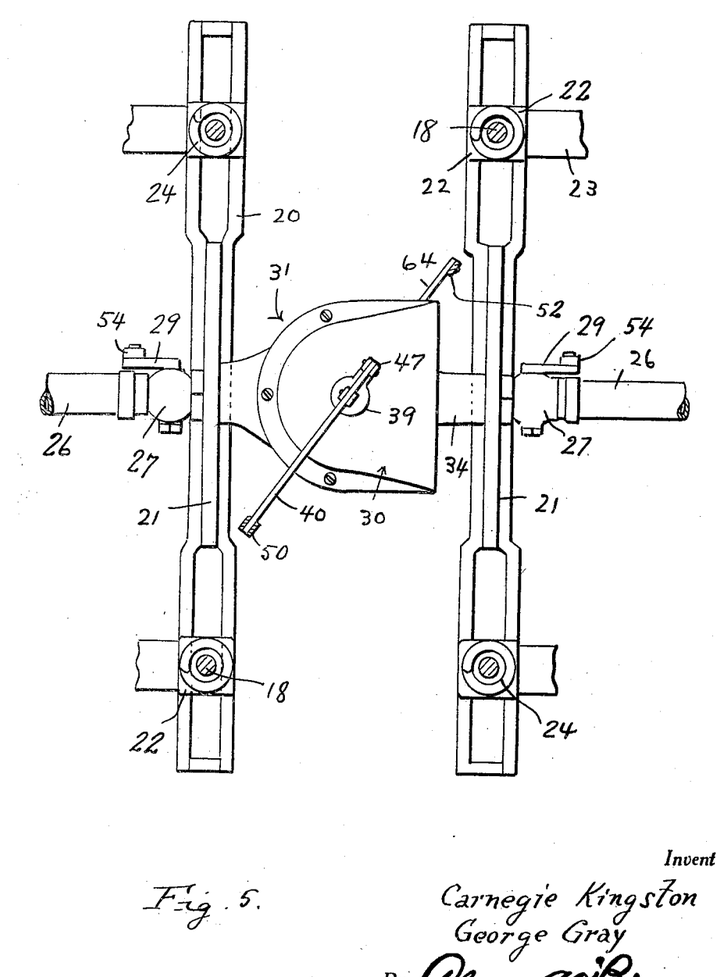
Figure 5 is a horizontal transverse sectional elevational view taken substantially on the line 5—5 of Figure 1.
Figure 6:
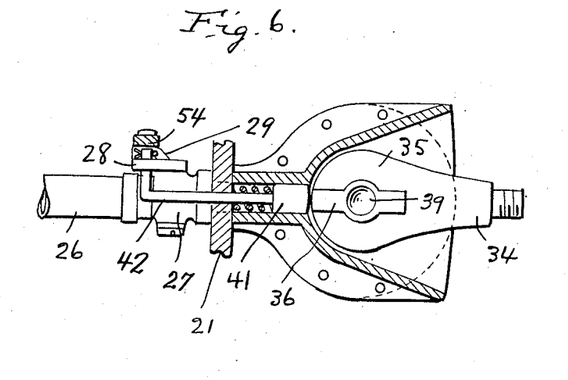
Figure 6 is a detail sectional elevational view taken through one of the train line couplings.
Figure 7:
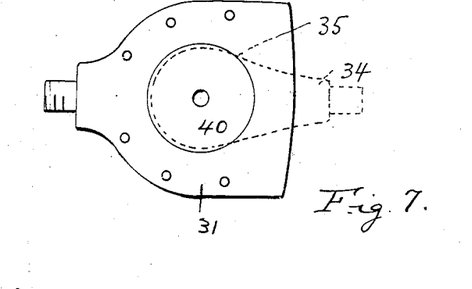
Figure 7 is a plan view thereof.
Figure 8:
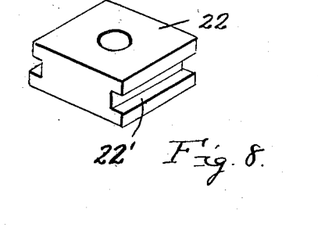
Figure 8 is a perspective view of a guide block forming part of the invention.

Briefly stated, the coupling member 30a includes two complemental and substantial identical sections 70, 71, each of which said sections is carried by a plate 21a corresponding to the plate 21 of Figure 4. Each of the coupling sections is provided with a solid portion 72 and a hollow box like portion 73 paralleling the portion 72 and open at one end. The solid portion 72 projects beyond the closed end of the portion 73 and at said end 73a is threadedly engaged with a plate 21a, and with one end of a train line 26a.

The solid portion 72 is also provided with a passage 74, corresponding to a passage 45 or 46 of Figure 3, and opening laterally of the solid portion 72 in the direction of the hollow box portion 73.

The hollow box like portion 73 at its closed end is reduced to provide a somewhat cylindrical projection 75, within which is a reciprocating plunger 76 that is spring pressed, and is equipped with a stem or rod 77 and having at its free end a pin and slot connection with one arm 78 of a pair of diverging crank arms provided on the stem of a control valve 27a arranged in the pipe line 26a.

From what has been said hereinbefore, it will be seen that when the sections 70, 71 of the coupling are in assembled relation, the solid portions 72 of the sections are received in the box portions 73 in parallelism whereby the passages 74 communicate one with the other to provide a connecting passage between the ends of the pipe line 26a.

Movement of the solid portions 72 inwardly of the hollow box portion 73 causes engagement of said solid portions 72 with the spring pressed plungers 76 forcing the same outwardly moving the valves 27a to open positions.

Valves 27 are normally retained in an opened position independently of the rods 77 by reason of a weighted arm 79 with which the stem of the valve 27a is equipped. (See Figures 11 and 12.)

By reason of the structure just described, it will be apparent that a closing of valve 27 may be accomplished without affecting the remaining parts of the coupling device 30a. For so closing the valves 27a there is suitably connected to an arm 80 of each valve, a link 81, connecting the arm 80 with a crank arm 82 provided on a rock shaft 83 suitably mounted transversely on one end of that railway car the train line of which the particular valve 27a is associated. The shaft 83 at either or both ends thereof may be equipped with a suitable crank handle to facilitate rotation of the shaft without necessity of entering between adjacent ends of two coupled cars.

The shaft 83 of either of the railway cars is equipped with a crank arm 84, while the shaft 83 of the other of the coupled railway cars is equipped with a crank arm 85 provided with a lateral pin 86 engageable with the forked end 84a of the crank arm 84. Thus it will be seen that by rocking either of the shafts 83 in a direction clearly discernible from a study of Figure 9, an upward pull will be exerted on the links 81 for moving the valves 27a to a closed position. The loose connections between the arms 78 and rods 77 enables a closing of the valves 27a without effecting such a force on the rods 77 as might result in an uncoupling of the coupling device 30a.

Thus it will be seen that a coupling device of this character will be effective as an emergency medium for controlling the brakes without possible resultant uncoupling of the cars or train lines.

The box like portion 73 of each section of the coupling is provided with a cylinder 87 within which is operable a spring pressed locking plunger 88, the stem of which is pivotally connected to a link 88' pivotally connected at one end to an arm 89 projecting laterally and upwardly from the cylinder 87. A link 90 connects the link 88' with a crank arm 91 provided on a shaft 83.

Figure 9:
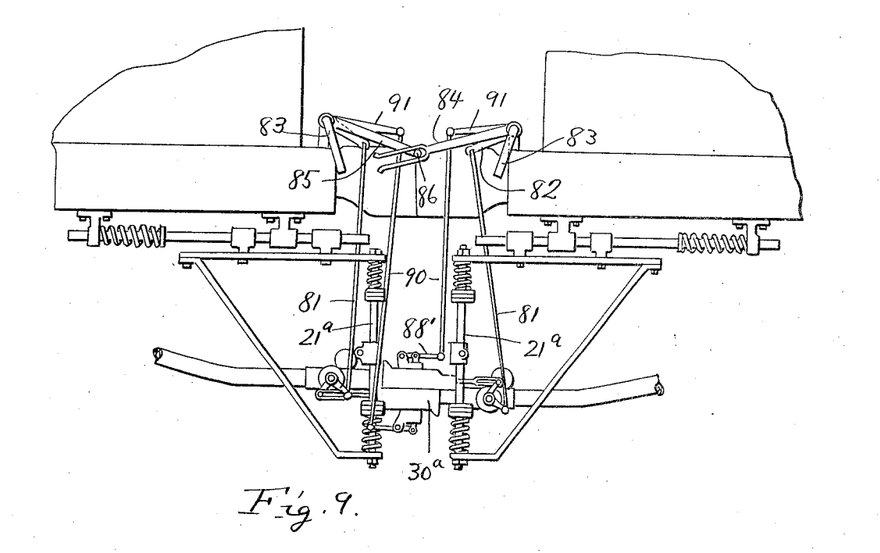
Figure 9 is a view similar to Figure 1 illustrating a modification of the invention.
Figure 10:
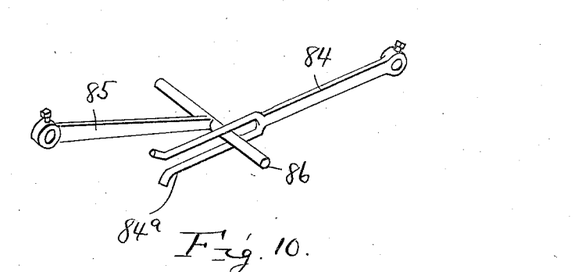
Figure 10 is a view showing the manner of operatively connecting two control shafts embodied in the structure shown in Figure 9.
Figure 11:
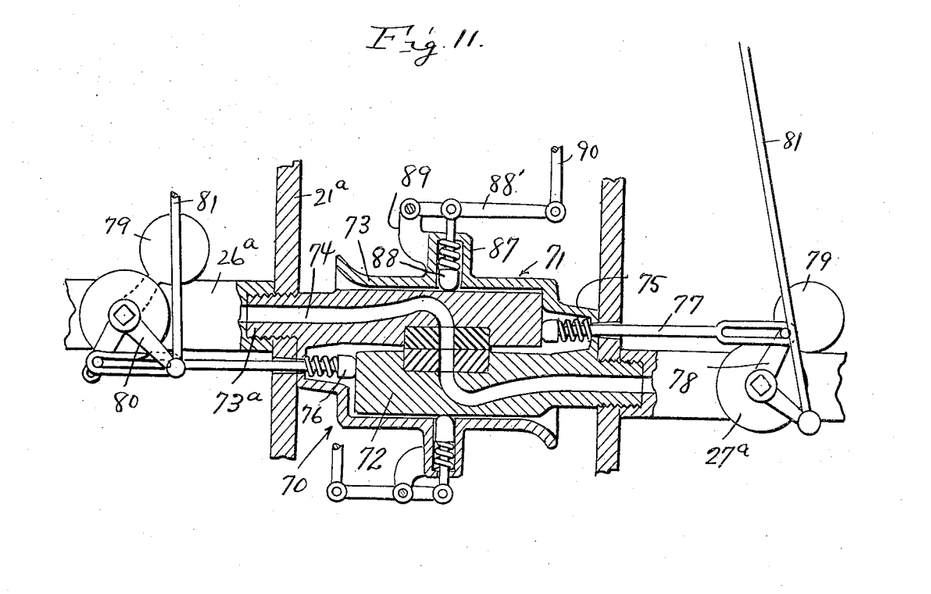
Figure 11 is a detail sectional elevational view of the emergency valved train line coupling.
Figure 12:
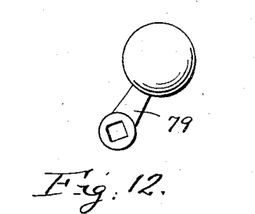
Figure 12 is an elevational view of a weighted arm.

Thus it will be seen that when the ends of the cars are coupled, by rocking a shaft 83 of one of the cars in a direction apparent from a study of Figure 9, an upward pull may be exerted on the links 90 for rocking the links 88' thus moving the plungers 88 out of frictional engagement with the solid portions 72 of the coupling sections to permit withdrawal of the solid portions 72 from the box like portions 73 upon movement of the cars in opposite directions, thus effecting a release of the coupling 30a.

Plunger 88 when in its innermost position, frictionally binds against the solid portion 72 within the hollow portion 73 for retaining the portions 72, 73 against movement relative to one another thus insuring an interrupted flow of air, or the like from one pipe line 26a to the other pipe line 26a when the cars are coupled together.

From the foregoing description, taken in connection with the accompanying drawings, it will be apparent that we have provided a simple and compact arrangement whereby the cars of a train will be effectually coupled, and at the same time the several train lines will be coupled in such a manner that leakage and loss of the fluid flowing through the train lines will be prevented.

Even though we have herein shown and described the preferred embodiments of our invention, it is to be understood that the same is susceptible of changes, modifications and improvements coming within the scope of the appended claims.

Having thus described our invention, what we claim as new is:

1. In a coupling for cars, and in combination with the ordinary car couplers, of male and female members located below the car couplers, valve means for coupling said male and female members with the cars carrying said car couplers, means for locking said male and female members in engagement with one another, and common actuating means for said locking means, said valves and the locking pins of the car couplers, supporting plates for said male and female coupling members, and means for suspending said plates from adjacent cars for movement longitudinally and laterally relative to said cars.

2. In a coupling for cars, and in combination with the ordinary car couplers, of male and female members located below the car couplers, valve means for coupling said male and female members with the cars carrying said car couplers, means for locking said male and female members in engagement with one another, and common actuating means for said locking means, said valves and the locking pins of the car couplers, supporting plates for said male and female coupling members, and means for suspending said plates from adjacent cars for movement longitudinally and laterally relative to said cars, and yieldable means normally urging said plates toward one another and directly opposite to each other.

3. A coupling for the purpose specified comprising in combination a pair of relatively shiftable plates, means for suspending said plates from adjacent cars, male and female coupling members mounted on each of said plates, means for releasably locking said male members in engagement with said female members, certain of said male and female members having passages extending therethrough, means for coupling the train line of the cars carrying said plates to said certain male and female coupling members; the remaining male and female coupling members cooperating to lock said plate against relative shifting movement.

4. A train line coupling for railway cars comprising in combination a pair of parallel rods, means for shiftably mounting said rods on the railway car, a plate, means for suspending said plate from said rods for lateral shifting movement relative to said rods, male and female coupling devices mounted on said plate, and valve means connecting said coupling members with the train lines of the car.

5. A train line coupling comprising in combination a pair of bars, means for mounting the same on a railway car for shifting movement relative to the car, rods suspended from said bars, a plate, means for suspending the plate between said rods, oppositely acting yieldable means for normally retaining the plate centered with respect to said rods, and coupling devices mounted on said plate, for connection with the train lines of the railway car.

6. A train line coupling comprising a pair of complemental members each of which is provided with a head portion and a box portion, a valve connecting said head portion with a train line, and said head portion provided with a passage therethrough whereby to provide uninterrupted communication between the train line of two coupled cars when the members of the coupling device are in assembled relation, means controlled by the coupling and uncoupling of said members for opening and closing said valve, and additional means for opening and closing said valves manually without effecting a release of the coupling.

7. In a train line coupling for cars, train line coupling devices, supporting plates therefor, means for suspending said plates from adjacent cars for movement longitudinally and laterally relative to said cars, yieldable means normally urging the plates longitudinally of the cars, additional yieldable means acting laterally on the plates for normally retaining the same directly opposite to each other and coupling means connecting the plates to retain them against relative movement.

8. A coupling for the purpose specified comprising in combination a pair of plates, shiftably mounted rods, means for suspending said plates from said rods, yieldable means acting on said plates independently of said rods, for centering said plates, and coupling means connecting the plates.

In testimony whereof we affix our signatures.

GEORGE GRAY.
CARNEGIE KINGSTON.